United States Patent
Ribaric et al.

(10) Patent No.: US 9,724,858 B2
(45) Date of Patent: Aug. 8, 2017

(54) METHOD FOR PRODUCING A BACKREST REAR PANEL

(71) Applicants: Johnson Controls GmbH, Burscheid (DE); Hyundai Motor Europe Technical Center GmbH, Rüsselsheim (DE)

(72) Inventors: David Ribaric, Köln (DE); Bernd Meier, Attendorn (DE); Vedat Nuyan, Wuppertal (DE); Annett Linemann, Saarbrücken (DE); Carsten Höfer, Kelsterbach (DE); Jerome Coulton, Maintal (DE); Peter Classen, Braunfels (DE)

(73) Assignees: Johnson Controls GmbH, Burscheid (DE); Hyundai Motor Europe Technical Center GmbH, Russelsheim (DE)

( * ) Notice: Subject to any disclaimer, the term of this patent is extended or adjusted under 35 U.S.C. 154(b) by 246 days.

(21) Appl. No.: 14/382,064

(22) PCT Filed: Mar. 1, 2013

(86) PCT No.: PCT/EP2013/054117
§ 371 (c)(1),
(2) Date: Aug. 29, 2014

(87) PCT Pub. No.: WO2013/127972
PCT Pub. Date: Sep. 6, 2013

(65) Prior Publication Data
US 2015/0076886 A1    Mar. 19, 2015

(30) Foreign Application Priority Data

Mar. 2, 2012    (DE) ........................ 10 2012 004 046

(51) Int. Cl.
*B60N 2/68* (2006.01)
*B29C 45/00* (2006.01)
(Continued)

(52) U.S. Cl.
CPC ............ *B29C 45/0003* (2013.01); *A47C 7/40* (2013.01); *B29C 45/14786* (2013.01);
(Continued)

(58) Field of Classification Search
CPC ................ B60N 2/686; B29C 45/0003; B29C 45/14786; A47C 7/40
(Continued)

(56) References Cited

U.S. PATENT DOCUMENTS

| 8,511,748 | B2 * | 8/2013 | McLeod | ................ | B60N 2/686 |
| | | | | | 297/216.1 |
| 2011/0020572 | A1 * | 1/2011 | Malek | .................... | B32B 27/08 |
| | | | | | 428/35.7 X |
| 2012/0241999 | A1 | 9/2012 | Kroner | | |

FOREIGN PATENT DOCUMENTS

| DE | 102009 034 767 A1 | 1/2011 |
| DE | 102009 39 404 A1 | 3/2011 |

(Continued)

OTHER PUBLICATIONS

Burkle E et al: "Verbundbauteile Mit Mehrprozessanlagen Wirtschaftlich Herstellen" Kunstoffe, Carl Hanser Verlag, Munich, DE, vol. 81, No. 3, Mar. 1, 1991 (Mar. 1, 1991), pp. 192-198, XP00287480, ISSN: 0023-5563, p. 195, col. 1, line 22-line 31, Fig.6.

(Continued)

*Primary Examiner* — Anthony D Barfield
(74) *Attorney, Agent, or Firm* — Foley & Lardner LLP

(57) ABSTRACT

In a method for producing a backrest rear panel from at least one organic sheet, a plurality of reinforcing beads and a (Continued)

Figure 1:
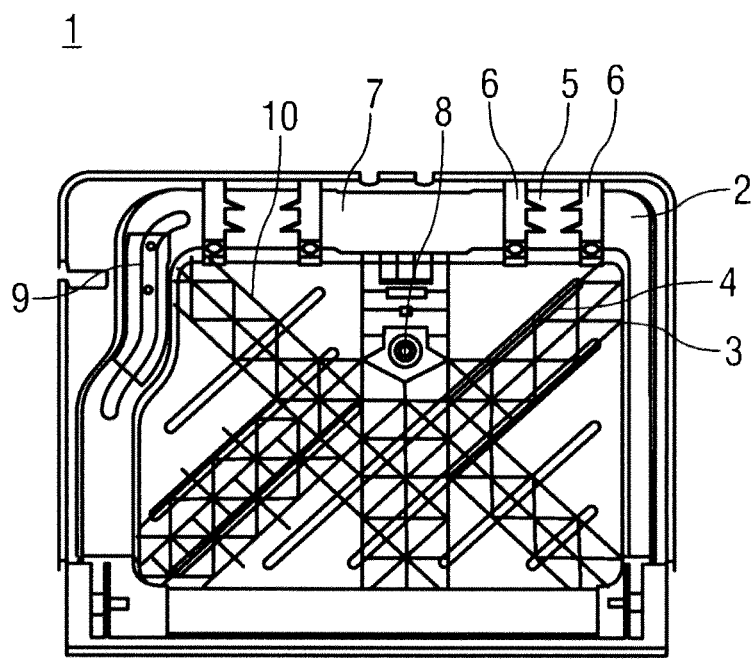

frame-shaped bead, which circles the reinforcing beads, are formed in at least one organic sheet. In a molding tool, a rib structure is formed in the circling frame-shaped bead on the rear of the backrest rear panel in such a manner that a rib structure closes flush with the rear of the backrest rear panel, with the result that an even surface is formed on the rear of the backrest rear panel. A bonded connection is formed between the organic sheet and rib structure with the result that a one-piece component is formed.

11 Claims, 3 Drawing Sheets

(51) Int. Cl.
- *B29C 45/14* (2006.01)
- *A47C 7/40* (2006.01)
- *B29L 31/00* (2006.01)
- *B29K 101/12* (2006.01)
- *B29K 301/12* (2006.01)

(52) U.S. Cl.
CPC .......... *B60N 2/686* (2013.01); *B29K 2101/12* (2013.01); *B29K 2301/12* (2013.01); *B29L 2031/771* (2013.01)

(58) Field of Classification Search
USPC .................................................. 297/452.18
See application file for complete search history.

(56) References Cited

FOREIGN PATENT DOCUMENTS

| | | |
|---|---|---|
| DE | 102009 040 901 A1 | 3/2011 |
| DE | WO 2011047748 A1 * | 4/2011 ............ B60N 2/366 |
| EP | 2 272 706 A2 | 1/2011 |
| WO | WO-2011/036185 A1 | 3/2011 |
| WO | WO-2011/095399 A1 | 8/2011 |
| WO | WO-2012/032189 A1 | 3/2012 |

OTHER PUBLICATIONS

International Search Report in PCT/EP2013/054117, 8 pages.

Lanxess: "Technische Information: Organoblech-die Innovation in der Hybridtechnik, Geringes Gewicht und hohe Festigkeit", Internet Citation Feb. 25, 2009 (Feb. 25, 2009), pp. 1-2, XP002664236, Retrieved from the Internet: URL:http://techcenter.lanxess.com/scp/emea/de/docguard/TI_2009-003_DE_Organoblech.pdf?docId=12427922 [retrieved on Nov. 23, 2011] the whole document.

Rolf Leonard: "Einsatz von Organoblech forciert den Leichtbau in der Hybridtechnik; Bauteile immer komplexer und leichter", Internet Citation, Aug. 23, 2010 (Aug. 23, 2010), p. 1, XP002664235, Retrieved from the Internet: URL:http://www.autokon.de/home/-article/16537511/29464061/Bauteile-immer-komplexer-und-leichter/art_co_INSTANCE_0000/maximized/[retrieved on Nov. 23, 2011] the whole document.

* cited by examiner

METHOD FOR PRODUCING A BACKREST REAR PANEL

CROSS REFERENCE TO RELATED APPLICATIONS

The present application is a U.S. National Stage of International Application No. PCT/EP2013/054117 filed on Mar. 1, 2013, which claims the benefit of German Patent Application No. 10 2012 004 046.6 filed on Mar. 2, 2012, the entire disclosures of all of which are incorporated herein by reference.

DESCRIPTION

The invention relates to a method for producing a backrest rear panel in accordance with the features of the preamble of claim 1. Furthermore, the invention relates to a backrest rear panel comprising at least one organosheet in accordance with the features of the preamble of claim 10.

In the prior art, backrest rear panels are produced from what are known as organosheets. Organosheets are thermoplastic panels which are reinforced by endless fibers. Since the organosheet has a thermoplastic matrix, it can be melted and can be encapsulated with the same thermoplastic. A distinction is made here between two methods. In the first method, pre-shaped organosheets are inserted into an injection molding die and are encapsulated with the thermoplastic. In the second method, the shaping of the organosheet takes place directly in the injection molding die.

DE 10 2009 039 404 A1 describes a seat element, such as a seat or backrest for, in particular, a vehicle seat, having a basic structure which is configured as an organosheet structure.

DE 10 2009 034 767 A1 describes organosheet structural components of hybrid design comprising an organosheet which is reinforced by means of thermoplastics and is suitable to transmit high mechanical loads, special flow promoting agents being added to the thermoplastics, in order to improve physical properties thereof.

The invention is based on the object of specifying a method for producing a backrest rear panel, which method is improved in comparison with the prior art, and an improved backrest rear panel comprising at least one organosheet.

With regard to the method, the object is achieved according to the invention by way of a method for producing a backrest rear panel having the features of claim 1.

With regard to the backrest rear panel, the object is achieved according to the invention by way of a backrest rear panel comprising at least one organosheet having the features of claim 10.

Preferred refinements and developments of the invention are specified in the dependent claims.

According to the invention, in the method for producing a backrest rear panel from at least one organosheet, a plurality of reinforcing beads and a frame-shaped bead which runs around them are shaped in at least one organosheet, and a rib structure being molded in the peripheral frame-shaped bead on the rear side of the backrest rear panel in an injection molding die in such a way that a rib structure terminates flush with the rear side of the backrest rear panel, with the result that a planar surface is formed on the rear side of the backrest rear panel, an integral joint being formed between the organosheet and the rib structure, with the result that a single-piece component is formed.

Here, a partial reinforcement can be achieved by means of the rib structure by way of overmolding of the backrest rear panel. If defined load paths or force introduction points are subjected to high forces, they can be reinforced by way of additional overmolding, for example a thickened wall portion and/or a ribbed portion.

Furthermore, a wall thickness can be reduced in comparison with conventional backrest rear panels, with the same load-bearing capability of the backrest rear panel according to the invention.

Backrest rear panels which are produced by means of the method advantageously have a reduced weight and are particularly flexurally rigid.

The production time of a backrest rear panel which is produced by means of the method according to the invention is reduced significantly as a result of the integration of a plurality of forming and shaping operations, for example production of the angled-over edges and lugs, shaping of the headrest bases, belt deflection means and lock receptacles, into one injection molding die.

Furthermore, a weight saving of up to 30% in comparison with conventional backrest rear panels is made possible.

The organosheet expediently comprises a thermoplastic matrix and is connected to at least one rib structure made from a thermoplastic which forms an integral joint with the material of the organosheet.

In order to obtain a particularly flexurally and/or torsionally rigid backrest rear panel, a cross section of the reinforcing beads and of the frame-shaped bead is shaped so as to be semicircular or in the shape of a partial circle or rectangular with rounded edges.

For a further increase in the strength and torsional rigidity, the individual ribs are arranged in a crossed manner within the rib structure.

The rib structure can particularly preferably be covered at least in regions or in sections with a covering element of planar or plate-shaped configuration which is arranged with an integral fit on the backrest rear panel and the rib structure.

Here, the covering element is advantageously adhesively bonded or welded to the rib structure which is arranged within the frame-shaped bead, in such a way that a closed profile is produced which has increased torsional rigidity and therefore stiffens the entire backrest rear panel.

The covering element is expediently formed from an organosheet of identical material or from an extruded section, extruded profile or injection molded part made from a thermoplastic with similar or comparable properties to the material of the organosheet. As a result, a simple integral arrangement of the covering element on the organosheet is made possible by way of melting of the covering element and the organosheet in sections.

Shaping of the organosheet in order to form the reinforcing beads and the peripheral frame-shaped bead is particularly advantageously carried out directly in the injection molding die. As a result, a number of dies and a number of processing steps are reduced significantly.

Individual ribs are particularly preferably of branched configuration along their course, with the result that their configuration can be carried out depending on the loads which occur during operation of the backrest rear panel and the load paths of said loads.

For the further reinforcement of the backrest rear panel, flatly shaped overmoldings and/or material reinforcements are arranged or formed on the organosheet and/or the rib structure in one advantageous embodiment in the region of connection geometries, such as headrest bases, receiving regions for a belt deflection means, receptacles for a belt winding apparatus and/or lock receptacle regions.

According to the invention, in the backrest rear panel comprising at least one organosheet, a plurality of reinforcing beads and a frame-shaped bead which runs around them are shaped in at least one organosheet, and a rib structure is molded in the peripheral frame-shaped bead on the rear side of the backrest rear panel in such a way that a rib structure terminates flush with the rear side of the backrest rear panel, with the result that a planar surface is formed on the rear side of the backrest rear panel, an integral joint being formed between the organosheet and the rib structure, with the result that a single-piece component is formed.

Figure 2:
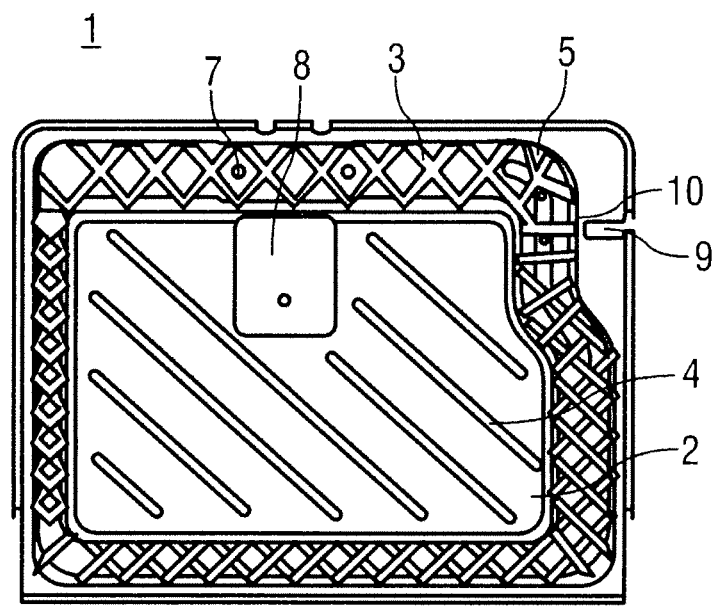
Figure 3:
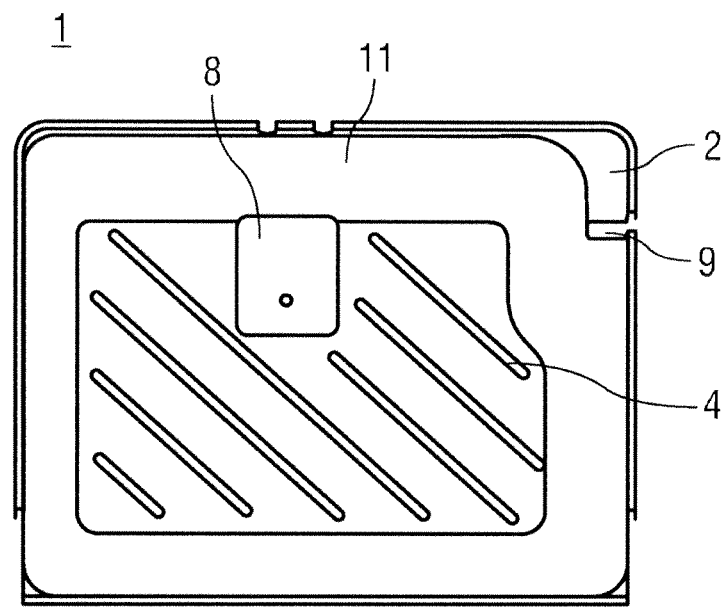
Figure 4:
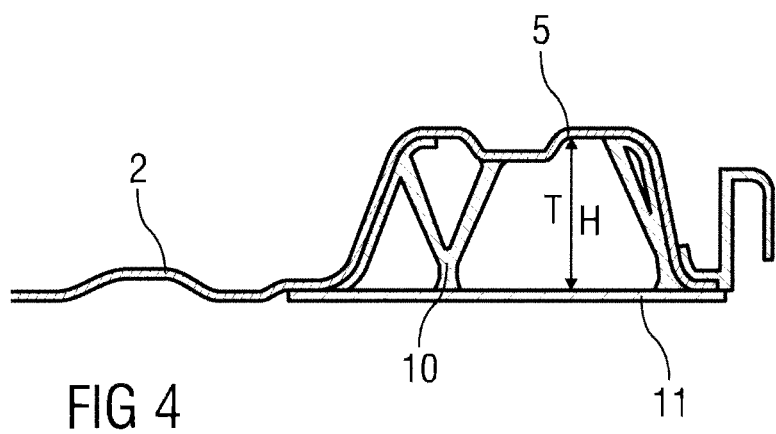
Figure 5:
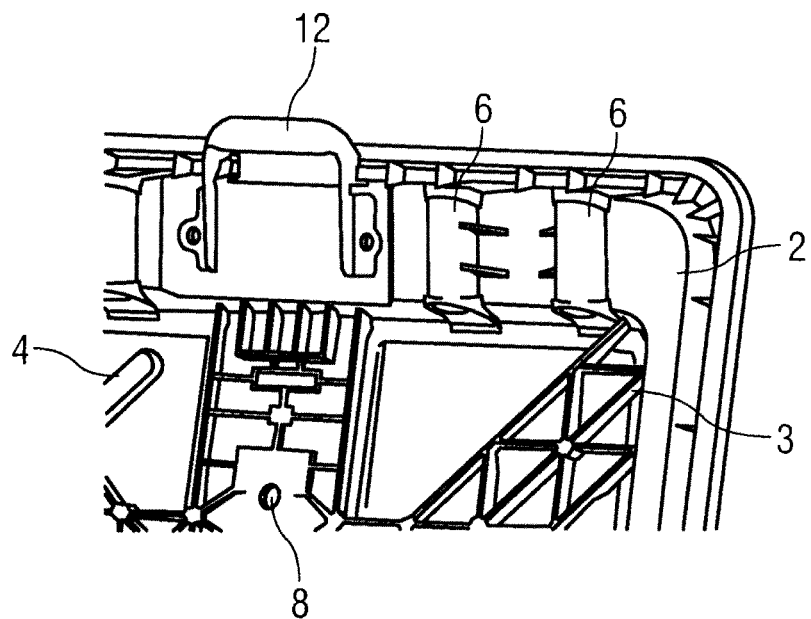
Figure 6:
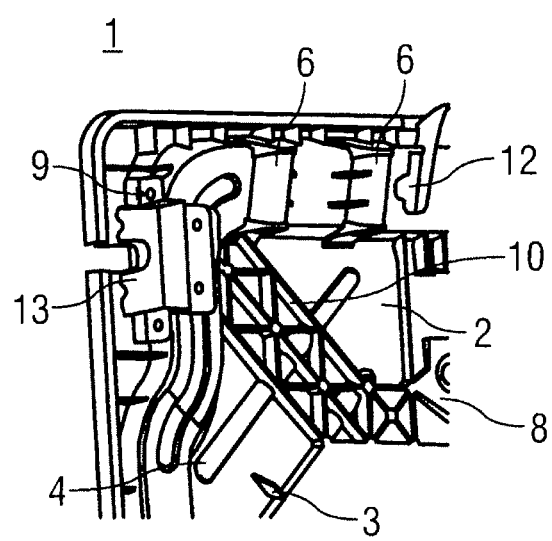

The invention will be explained in greater detail using the appended diagrammatic figures, in which:

FIG. 1 diagrammatically shows a perspective illustration of a backrest rear panel which is produced by means of the method according to the invention, in a front view, FIG. 2 diagrammatically shows a rear view of a backrest rear panel which is produced by means of the method according to the invention, FIG. 3 diagrammatically shows a rear view of a backrest rear panel which is produced by means of the method according to the invention, with a covering element, FIG. 4 diagrammatically shows a sectional illustration of a rib structure which is formed in the backrest rear panel, FIG. 5 diagrammatically shows a detailed view of headrest bases which are integrated into the backrest rear panel, and a belt deflection means which is arranged thereon, and FIG. 6 diagrammatically shows a detailed view of headrest bases which are integrated into the backrest rear wall, and a lock receptacle region which is arranged thereon.

Parts which correspond to one another are provided with the same designations in all the figures.

FIG. 1 diagrammatically shows a perspective illustration of a backrest rear panel 1 which is produced by means of the method according to the invention, in a front view.

The backrest rear panel 1 is formed from what is known as an organosheet 2 and a rib structure 3.

The organosheet 2 is a conventional organosheet. An organosheet 2 is a flat semi-finished product made from a thermoplastic, into which a woven fabric of glass, carbon and/or aramid fibers or a mixed form thereof is introduced in such a way that the fibers are coated and enclosed completely with thermoplastic. Organosheets 2 are therefore thermoplastic panels which are reinforced by endless fibers. Organosheets 2 can be shaped by heating and subsequent pressing in short cycle times to form three-dimensional components.

Since the organosheet 2 has a thermoplastic matrix, it can be melted and can be encapsulated with identical thermoplastic in an injection molding die (not shown). In this way, the rib structure 3 which is composed of the same thermoplastic as the organosheet 2 is applied to the organosheet 2, with the result that an integrated and therefore single-piece component is formed from the organosheet 2 and the rib structure 3.

The rib structure 3 can be applied to a front side of the organosheet 2 and therefore of the backrest rear panel 1.

A distinction is made here between two methods. In the first method, the pre-shaped organosheet 2 is inserted into an injection molding die and is encapsulated with the thermoplastic in order to form the rib structure 3. In the second method, the shaping of the organosheet 2 takes place directly in the injection molding die.

Various connection geometries, such as headrest bases 6, a receiving region 7 for a belt deflection means, a receptacle 8 for a belt winding apparatus and/or a lock receptacle region 9, can be shaped or formed in the rib structure 3.

FIG. 2 diagrammatically shows a rear view of the backrest rear panel 1 which is produced by means of the method according to the invention. A plurality of reinforcing beads 4 which are enclosed by a peripheral frame-side bead 5 are formed in the organosheet 2. A cross section of the reinforcing beads 4 and of the frame-shaped bead 5 is shaped, in particular, so as to be semicircular or in the shape of a partial circle or rectangular with rounded edges.

An arrangement of the reinforcing beads 4 in the organosheet 2 takes place in an analogous manner to the arrangement of the reinforcing beads in a conventional backrest rear panel which is produced from sheet metal. Here, the reinforcing beads 4 extend diagonally over the organosheet 2. The reinforcing beads 4 preferably have the same geometric dimensions as reinforcing beads in a conventional backrest rear panel which is produced from sheet metal, the geometric shaping and a spatial arrangement of the reinforcing beads 4 in the organosheet 2 preferably taking place depending on the loads which occur during operation of the backrest rear panel 1.

Ribs 10 are preferably molded onto the reinforcing beads 4 on the front side. The ribs 10 are preferably arranged centrally on the reinforcing beads 4 and are widened in a foot region in such a way that a pedestal-like region and a resulting enlarged contact area between the foot region of the rib 10 and the reinforcing rib 4 is formed.

Here, the ribs 10 are arranged in such a way that they preferably connect the connection geometries to one another, in order to transmit flexural and torsional forces in a suitable form.

A further rib structure 3 which preferably terminates flush with the rear side of the backrest rear panel 1 is arranged on the rear side of the backrest rear panel 1 in the peripheral frame-shaped bead 5. The individual ribs 10 are preferably arranged in a crossed manner within the rib structure 3.

FIG. 3 diagrammatically shows a rear view of a backrest rear panel 1 which is produced by means of the method according to the invention, with a covering element 11. The rib structure 3 can be covered at least in regions by means of a covering element 11 of this type which is preferably of planar or plate-shaped configuration. The covering element 11 can be adhesively bonded or welded to the rib structure 3, as a result of which a closed profile is produced which has an increased torsional rigidity and therefore stiffens the entire backrest rear panel 1.

The covering element 11 can be made from organosheet or else from an extruded section, extruded profile or injection molded part with equivalent thermoplastic. The covering element 11 is preferably welded to the backrest rear panel 1 and the rib structure 3 by means of a conventional thermoplastic welding method, such as vibration welding, induction welding, ultrasonic welding or warm contact welding.

FIG. 4 diagrammatically shows a sectional illustration of a rib structure 3 which is formed in the backrest rear panel 1. The rib structure 3 is formed from a plurality of individual ribs 10, the height H of which is configured so as to correspond to a depth T of the frame-shaped bead 5, with the result that a planar surface is formed on the rear side of the backrest rear panel 1.

In one possible embodiment, individual ribs 10 can be of branched configuration along their course.

FIG. 5 diagrammatically shows a detailed view of headrest bases 6 which are integrated into the backrest rear panel 1, and a belt deflection means 12 which is arranged thereon.

The headrest bases 6 are integrated and formed into the rib structure 3 in the upper region of the backrest rear panel 1 in such a way that headrest rods of conventional headrests (not shown) can be arranged in them. The headrest bases 6 are preferably formed in the injection molding die by means of a slide.

Furthermore, a receiving region 7 for a conventional belt deflection means 12 is formed in the upper region of the backrest rear panel 1. Here, the belt deflection means 12 can be arranged as a separate component in a conventional way on the receiving region 7, for example can be screwed or riveted.

FIG. 6 diagrammatically shows a detailed view of headrest bases 6 which are integrated into the backrest rear panel 1, and a lock receptacle region 9 which is arranged thereon. In the upper region of the backrest rear panel 1, the lock receptacle region 9 is formed laterally in such a manner that a conventional lock connector 13 can be arranged thereon. Here, the lock connector 13 is configured as a separate component and is preferably fastened by means of four conventional screws (not shown). The rib structure 3 is formed in the lock receptacle region 9 so as to correspond to the lock connector 13. The direct arrangement of the lock connector 13 on the backrest rear panel 1 makes a particularly durable and a rigid connection between both components and a uniform and direct introduction of force into the backrest rear panel 1 possible.

The receptacle 8 is formed in a middle region of the backrest rear panel 1 in such a way that a conventional belt winding apparatus (not shown) can be arranged thereon.

Particularly high forces are introduced into the backrest rear panel 1 by means of the lock connector 13, the belt deflection means 12 and/or the belt winding apparatus. These highly loaded regions can be reinforced by way of flatly formed overmoldings and/or material reinforcements. Here, the overmoldings and/or material reinforcements preferably have a wall thickness between 1 and 4 mm.

LIST OF DESIGNATIONS

1 Backrest rear panel
2 Organosheet
3 Rib structure
4 Reinforcing beads
5 Bead
6 Headrest base
7 Receiving region
8 Receptacle
9 Lock receptacle region
10 Rib
11 Covering element
12 Belt deflection means
13 Lock connector
H Height
T Depth

The invention claimed is:

1. A backrest rear panel comprising:
at least one organosheet,
wherein the organosheet comprises a plurality of reinforcing beads and a frame-shaped bead that are shaped in a body of the at least one organosheet such that the organosheet is profiled and nonplanar along a rear side and a front side of the organosheet,
wherein the frame-shaped bead is positioned around a periphery of the plurality of reinforcing beads; and
a rib structure molded in the frame-shaped bead on the rear side of the organosheet,
wherein the rib structure terminates flush with a first portion of the rear side of the organosheet such that the first portion of the rear side of the organosheet and the rib structure together have a planar surface,
wherein the organosheet and the rib structure have an integral joint therebetween such that the organosheet and the rib structure are a single-piece component.

2. The backrest rear panel as claimed in claim 1, wherein the organosheet comprises a thermoplastic matrix and is connected to at least one portion of the rib structure made from a thermoplastic which forms the integral joint with the material of the organosheet.

3. The backrest rear panel as claimed in claim 1, wherein a cross-section of the reinforcing beads and a cross-section of the frame-shaped bead are each one of a semicircle, a partial circle, or a rectangle with rounded edges.

4. The backrest rear panel as claimed in claim 1, wherein individual ribs are arranged in a crossed manner within the rib structure.

5. The backrest rear panel as claimed in claim 1, wherein the rib structure can be covered at least in regions or in sections with a covering element of planar or plate-shaped configuration, wherein the organosheet and the rib structure are configured to integrally attach with the cover element.

6. The backrest rear panel as claimed in claim 5, wherein the covering element is adhesively bonded or welded to the rib structure, wherein the rib structure is arranged within the frame-shaped bead, wherein the frame-shaped bead has a closed profile with the covering element.

7. The backrest rear panel as claimed in claim 5, wherein the covering element is formed one of from a second organosheet that is an identical material to the organosheet or from an extruded section, extruded profile, or injection molded part made from a thermoplastic with similar or comparable properties to the material of the organosheet.

8. The backrest rear panel as claimed in claim 1, wherein an injection molding die directly shapes the organosheet in order to form the reinforcing beads and the frame-shaped bead.

9. The backrest rear panel as claimed in claim 1, wherein individual ribs of the rib structure have a branched configuration along the length of the individual ribs.

10. The backrest rear panel as claimed in claim 1, wherein the rib structure extends between a first end and a second end, wherein the first end of the rib structure is attached to the frame-shaped bead and the second end of the rib structure is flush with the rear side of the organosheet.

11. The backrest rear panel as claimed in claim 10, wherein the first end of the rib structure is positioned on a second portion of the rear side of the organosheet within the frame-shaped bead, wherein the second portion of the rear side of the organosheet is not within the planar surface of the first portion of the rear side of the organosheet and the rib structure.

* * * * *